Figure 1:
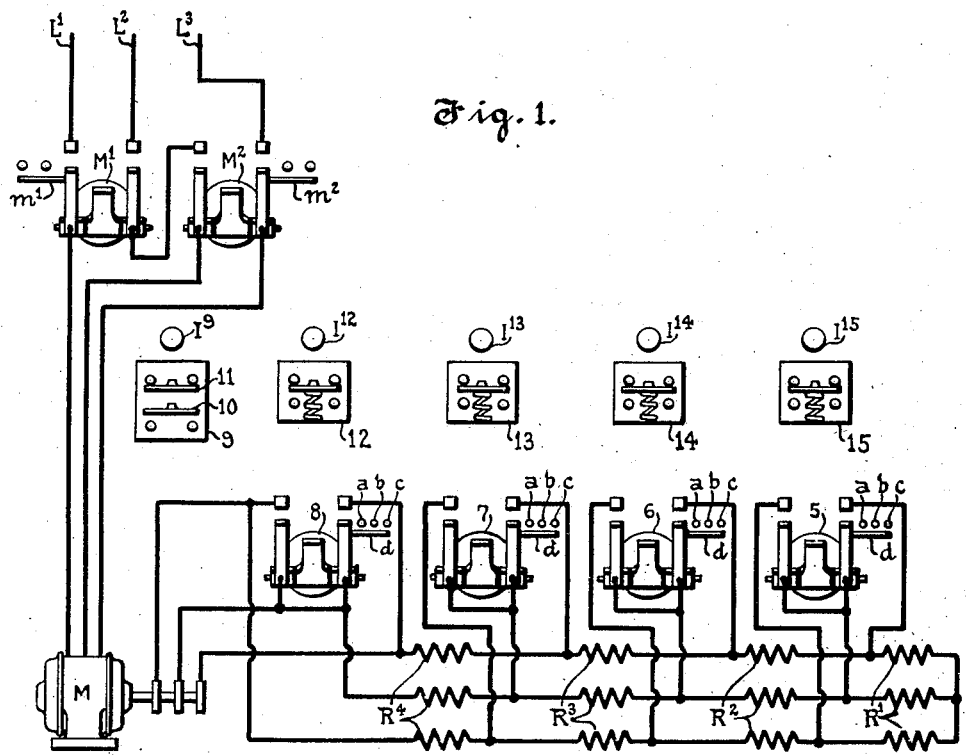

Oct. 18, 1927.

E. W. SEEGER 1,646,171

MOTOR CONTROLLER

Filed Aug. 30, 1924

INVENTOR
Edwin W. Seeger
BY Frank H. Hubbard.
ATTORNEY

Patented Oct. 18, 1927.

1,646,171

UNITED STATES PATENT OFFICE.

EDWIN W. SEEGER, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR CONTROLLER.

Application filed August 30, 1924. Serial No. 735,061.

This invention relates to motor controllers, and is particularly applicable to motor controllers of the push button operated type.

The invention has among its objects to provide an improved controller of the aforesaid character including a plurality of push buttons for effecting acceleration of the motor in steps, and electrical interlocks rendering such push buttons ineffective to effect acceleration of the motor except upon operation thereof in a given sequence.

Another object is to provide a controller of the aforesaid character wherein provision is made for automatically bringing the motor to a selected speed from any higher speed by operation of the push button corresponding to such selected speed.

Another object is to provide a controller of the aforesaid character having means associated therewith for indicating the speed at which the motor is operating.

Various other objects and advantages of the invention will hereinafter appear.

The accompanying drawing diagrammatically illustrates a controller embodying the invention and the same will now be described, it being understood that the controller illustrated is capable of use in connection with other types of motors than that shown in the drawing.

Figure 2:
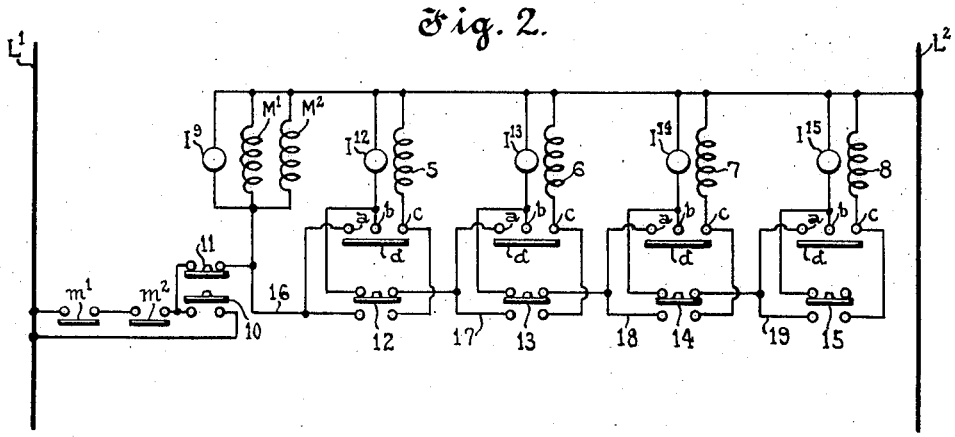

In the drawing:

Figure 1 diagrammatically illustrates the elements of a controller embodying the invention, and Fig. 2 is a so-called across-the-line diagram of the control circuits for the elements illustrated in Fig. 1.

Referring to Fig. 1, the same illustrates a three phase alternating current motor M, a power circuit therefor indicated by lines L', L² and L³ and resistance sections R' to R⁴, inclusive, to be included and excluded in the secondary circuit of the motor for speed regulating purposes.

The controller includes separate double pole electromagnetic switches M¹ and M² for controlling the continuity of the power connections for the motor, and a series of double pole electromagnetic switches 5, 6, 7 and 8 for including and excluding resistance sections R', R², R³ and R⁴ respectively, in the secondary circuit of the motor. Switches M¹ and M² are controlled from a push button station 9, said station including a normally open "starting" push button 10 and a normally closed "stop" push button 11. Switches 5, 6, 7 and 8 are controlled from push button stations 12, 13, 14 and 15, respectively, the push button of each of said stations being normally in engagement with a pair of up contacts and being movable out of engagement therewith and into engagement with a pair of down contacts. For purposes hereinafter set forth, switches M¹ and M² are provided with normally open auxiliary contacts m¹ and m², respectively, and each of switches 5 to 8, inclusive, is provided with auxiliary stationary contacts a, b and c to be bridged by a normally open contact d. The controller further includes a series of speed indicating lamps indicated by reference character I, one of said lamps being associated with each of the aforementioned control stations. The function and operation of the aforedescribed controller, together with the circuit connections therefor, will now be more fully described in connection with Fig. 2. As shown in this figure, the operating windings of switches M¹ and M², together with the indicating lamp I⁹ of control station 9, are permanently connected in parallel between the right hand contact of stop push button 11 and line L². Push button switches 10 and 11 are connected in series between line L' and the operating windings of switches M¹ and M² whereby closure of switch 10 effects energization of said windings. Upon response of switches M¹ and M², the auxiliary contacts m¹ and m² thereof shunt the normally open push button 10 and said switches will therefore be maintained in closed position through the medium of the normally closed stop push button 11 and the indicating lamp I⁹ will also be maintained energized as long as said switches remain in closed position.

The operating winding of each of the switches 5, 6, 7 and 8 has one terminal permanently connected to line L² and its opposite terminal permanently connected to the auxiliary contact c of its respective switch. Also, the indicating lamp I of each of the control stations 12, 13, 14 and 15 has one terminal permanently connected to line L² and its opposite terminal permanently connected to the auxiliary contact b of its associated accelerating switch. The push button stations 12, 13, 14 and 15 are all similarly connected, the down contacts thereof being connected in shunt to the auxiliary contacts $a$ and $c$ of their respective accelerating switches, and the left hand up contacts thereof being permanently connected to the intermediate auxiliary contact $b$ of their respective switches. The left hand down contact of control station 12 is permanently connected to the right hand contact of stop push button 11 by a conductor 16, while the control stations 13, 14 and 15 have their left hand down contacts connected by conductors 17, 18 and 19, respectively, to the right hand up contacts of the preceding push button station.

With the connections above described, it is apparent that upon closure of switches $M^1$ and $M^2$ accelerating switch 5 will be energized immediately upon depression of push button 12, depression of such button serving to establish an energizing circuit extending from line $L'$ through the auxiliary switches $m^1$ and $m^2$ of main switches $M^1$ and $M^2$ through stop push button 11 to conductor 16, through the down contacts of switch 12 to auxiliary contact $c$ of switch 5 and through the operating winding of said switch to line $L^2$. Upon response of accelerating switch 5, the auxiliary contacts $a$ and $c$ thereof shunt the down contacts of push button 12 to maintain said switch in closed position and the speed indicating lamp $I^{12}$ is energized through the medium of contacts $a$, $b$ and $d$ of switch 5. With switch 5 in closed position, accelerating switch 6 will respond upon depression of push button 13, the energizing circuit therefor being established from line $L'$ to conductor 16 as already traced, through contacts $a$ and $b$ of switch 5 and the up contacts of push button station 12 by conductor 17 through the down contacts of push button station 13 to auxiliary contact $c$ of switch 6 and thence through the operating winding of said switch to line $L^2$. Upon response of switch 6, the auxiliary contacts $a$ and $c$ thereof parallel the down contacts of push button 13 to maintain said switch in closed position and the indicating lamp $I^{13}$ is energized through the medium of contacts $a$, $b$ and $d$ of switch 6. Upon closure of switch 6, circuit is established from line $L'$ to conductor 17 as already traced to and through contacts $a$ and $b$ of said switch and thence through the up contacts of push button station 13 by conductor 18 to the left hand down contacts of push button 14. Thus upon depression of push button 14 the operating winding of switch 7 will be connected across lines $L'$ and $L^2$, and in responding said switch will maintain itself through its auxiliary contacts $a$ and $c$ which shunt the down contacts of push button 14. Also the speed indicating lamp $I^{14}$ will be connected in parallel with the operating winding of switch 7 by the auxiliary contacts $a$, $b$ and $d$ of switch 7. Upon response of switch 7, circuit is established from line $L'$ to conductor 18 as already traced, and thence through the auxiliary contacts $a$ and $b$ of switch 7 to and through the up contacts of push button 14 and by conductor 19 to the left hand down contacts of push button 15. Thus with switch 7 in closed position depression of push button 15 connects the operating winding of switch 8 across line $L'$ and $L^2$, and upon response of such switch the auxiliary contacts $a$ and $c$ thereof shunt the down contacts of push button 15 to maintain said switch in closed position and the contacts $a$, $b$ and $d$ of said switch serve to establish an energizing circuit for lamp $I^{15}$.

In connection with the foregoing it should be noted that each of the push button control stations is ineffective except upon closure of the switch associated with the preceding push button control station, and it is, thus necessary, in order to bring the motor up to speed, to operate the push button stations in above described sequence. Furthermore, it is apparent that if the motor is operating at any speed, depression of the stop push button 11 will immediately interrupt the energizing circuit of both main switches $M^1$ and $M^2$, and accelerating switches 5 to 8 effect stopping of the motor. Furthermore, it should be noted that if the motor is operating at any given speed, the same can be brought to any selected lower speed by depressing the push button corresponding to such selected speed, depression of such button serving to interrupt the energizing circuits for the push button stations corresponding to the higher speeds.

What I claim as new and desire to secure by Letters Patent is:

1. In a motor controller, in combination, a plurality of electro-responsive control switches for the motor, a control station for each of said switches, each of said stations including a control member biased towards a given normal position and means necessitating movement of said control members out of and into their normal positions in a given sequence to effect closure of said switches.

2. In a motor controller, in combination, a plurality of electro-responsive control switches for the motor, and control means for said switches insuring closure thereof in a given sequence, said means including a plurality of push buttons normally in a given position and adapted when moved out of and into their normal positions in a given sequence to effect closure of said switches.

3. In a motor controller, in combination, a plurality of electro-responsive control switches for the motor to be closed in a given sequence, each of said switches having auxiliary control contacts associated therewith, a control station for each of said switches, each of said control stations including normally open and normally closed push button contacts, the normally open push button contacts of each of said stations being adapted to control the energizing winding of the switch associated therewith, and the normally closed contacts of each of said stations being adapted through the medium of the auxiliary contacts associated with its respective switch to control the energizing circuit of the control station associated with the next switch of the sequence.

4. In a motor controller, in combination, a plurality of electro-responsive control switches to be closed in a given sequence, a push button station for each of said switches each of said stations including a push button member having two operative positions and normally biased towards one of such positions, and means necessitating movement of said push button members out of and into their normal positions in a given sequence to effect closure of said electro-responsive switches, said means providing for opening of any of said electro-responsive switches by movement of the push button member associated with a preceding switch out of normal position.

5. In a motor controller, in combination, a plurality of electro-responsive control switches for the motor, a push button control station for each of said switches, a speed indicating lamp associated with each of said push button stations, auxiliary contacts associated with each of said switches and circuit connections controlled by said push button stations and said auxiliary contacts to insure closure of said switches in a given sequence and to effect energization of the speed indicating lamp associated with each of said stations upon response of its respective switch.

In witness whereof, I have hereunto subscribed my name.

EDWIN W. SEEGER.